(12) United States Patent
Li et al.

(10) Patent No.: US 9,639,609 B2
(45) Date of Patent: May 2, 2017

(54) ENTERPRISE SEARCH METHOD AND SYSTEM

(75) Inventors: Hang Li, Beijing (CN); Yunhua Hu, Beijing (CN); Xin Zou, Beijing (CN); Xiaoyuan Cui, Beijing (CN); Guangping Gao, Beijing (CN); Dmitriy Meyerzon, Bellevue, WA (US); Victor Poznanski, Samammish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 765 days.

(21) Appl. No.: 12/391,484

(22) Filed: Feb. 24, 2009

(65) Prior Publication Data

US 2010/0228711 A1 Sep. 9, 2010

(51) Int. Cl.
*G06F 17/30* (2006.01)

(52) U.S. Cl.
CPC .................. *G06F 17/30864* (2013.01)

(58) Field of Classification Search
CPC ................. G06F 17/30; G06F 17/00
See application file for complete search history.

(56) References Cited

U.S. PATENT DOCUMENTS

| | | | | |
|---|---|---|---|---|
| 5,983,237 A * | 11/1999 | Jain | ............... | G06F 17/30256 |
| 6,145,003 A * | 11/2000 | Sanu | ............... | H04L 29/12009 |
| | | | | 707/999.003 |
| 6,199,081 B1 * | 3/2001 | Meyerzon | ............ | G06F 17/218 |
| | | | | 707/999.006 |
| 6,256,627 B1 * | 7/2001 | Beattie | ............... | G06F 17/30864 |
| 6,292,830 B1 * | 9/2001 | Taylor | ............... | G06N 5/043 |
| | | | | 709/224 |
| 6,353,831 B1 * | 3/2002 | Gustman | ............ | G06F 17/30038 |
| | | | | 707/740 |
| 6,385,600 B1 * | 5/2002 | McGuinness | ..... | G06F 17/30864 |
| 7,308,442 B2 | 12/2007 | Takahashi et al. | | |
| 7,395,260 B2 * | 7/2008 | Oral | ............... | G06F 17/30696 |
| 7,493,303 B2 * | 2/2009 | Newbold | ........... | G06F 17/30864 |
| 7,496,563 B2 * | 2/2009 | Newbold | ........... | G06F 17/30696 |
| 7,634,461 B2 * | 12/2009 | Oral | ............... | G06F 17/30011 |
| 7,660,793 B2 * | 2/2010 | Indeck | ............... | G06F 17/30595 |
| | | | | 707/770 |

(Continued)

OTHER PUBLICATIONS

H.L. Van and A. Trentini, "FAQshare: a frequently asked questions voting system as a collaboration and evaluation tool in teaching activities," Proc. of the 14th International Conference on Software Engineering and Knowledge Engineering, Ischia, Italy, 2002, pp. 557-560.*

(Continued)

*Primary Examiner* — Farhan Syed
(74) *Attorney, Agent, or Firm* — Lee & Hayes, PLLC

(57) ABSTRACT

A system and method for enterprise search includes one or more computer-readable media storing computer-executable instructions that, when executed on one or more processors that perform acts including extracting one or more of term data, personal data and metadata from one or more predetermined resources; retrieving a set of information derived from the extracted term data, personal data and metadata responsive to a query; and receiving feedback responsive to the set of information, the feedback augmenting at least one of the one or more predetermined resources.

20 Claims, 10 Drawing Sheets

(56) References Cited

U.S. PATENT DOCUMENTS

| | | | |
|---|---|---|---|
| 7,831,601 B2* | 11/2010 | Oral | G06F 17/30696 707/722 |
| 7,933,896 B2* | 4/2011 | Dexter | G06F 17/24 707/722 |
| 2006/0100998 A1 | 5/2006 | Edwards et al. | |
| 2006/0224579 A1 | 10/2006 | Zheng | |
| 2006/0235984 A1 | 10/2006 | Kraus et al. | |
| 2008/0034381 A1* | 2/2008 | Jalon | G06F 17/30126 719/329 |
| 2008/0040114 A1* | 2/2008 | Zhou et al. | 704/257 |
| 2008/0082513 A1* | 4/2008 | Oral | G06F 17/30696 |
| 2008/0114724 A1* | 5/2008 | Indeck | G06F 17/30595 |
| 2008/0114725 A1* | 5/2008 | Indeck | G06F 17/30985 |
| 2008/0168037 A1 | 7/2008 | Kapadia et al. | |
| 2008/0263007 A1* | 10/2008 | Schmidt | G06F 17/30383 |
| 2009/0119280 A1* | 5/2009 | Waters | G06F 17/30864 |
| 2010/0083105 A1* | 4/2010 | Channabasavaiah | G06F 17/30867 715/273 |
| 2010/0094858 A1* | 4/2010 | Indeck | G06F 17/30595 707/706 |
| 2010/0228711 A1* | 9/2010 | Li | G06F 17/30864 707/706 |
| 2010/0268708 A1* | 10/2010 | Zhang | G06F 17/30663 707/726 |
| 2011/0106786 A1* | 5/2011 | Waters | H04W 4/003 707/709 |

OTHER PUBLICATIONS

S.Y. Yang, et al., FAQ-master: An Ontological Multi-Agent System for Web FAQ Services, WSEAS Transactions on Information Science & Applications, Mar. 2008, Issue 3, vol. 5, pp. 221-228.*

S.Y. Yang, et al., "Ontololgy-Supported Faq Processing and Ranking Techniques," International Journal of Intelligent Information Systems, vol. 28, No. 3, 2007, pp. 233-251.*

Harper, F. Maxwell, Rabin, Daphne, Rafaeli, Sheizaf, and Konstan, Joseph, "Predictors of Answer Quality in Online Q&A Sites," IEEE CHI 2008 Proceedings of Exploring Web Content, Apr. 5-10, 2008, pp. 865-874.*

Jung, Seikyung, Jonathan L. Herlocker, and Janet Webster. "Click data as implicit relevance feedback in web search." Information Processing & Management 43.3 (2007): 791-807.*

Wang, Xin-Jing, Xudong Tu, Dan Feng, and Lei Zhang. "Ranking community answers by modeling question-answer relationships via analogical reasoning." In Proceedings of the 32nd international ACM SIGIR conference on Research and development in information retrieval, pp. 179-186. ACM, 2009.*

Jeon, Jiwoon, W. Bruce Croft, and Joon Ho Lee. "Finding similar questions in large question and answer archives." In Proceedings of the 14th ACM international conference on Information and knowledge management, pp. 84-90. ACM, 2005.*

Xue, Xiaobing, Jiwoon Jeon, and W. Bruce Croft. "Retrieval models for question and answer archives." In Proceedings of the 31st annual international ACM SIGIR conference on Research and development in information retrieval, pp. 475-482. ACM, 2008.*

Jeon, Jiwoon, W. Bruce Croft, Joon Ho Lee, and Soyeon Park. "A framework to predict the quality of answers with non-textual features." In Proceedings of the 29th annual international ACM SIGIR conference on Research and development in information retrieval, pp. 228-235. ACM, 2006.*

Jijkoun, Valentin, and Maarten de Rijke. "Retrieving answers from frequently asked questions pages on the web." In Proceedings of the 14th ACM international conference on Information and knowledge management, pp. 76-83. ACM, 2005.*

"Question: Discussion/Forum Feature . . . ", retrieved on Dec. 5, 2008 at <<http://www.google.com/support/forum/p/Google+Apps/thread?tid=341aeb07d101bb4f&h1=en>>, Google, 2008, pp. 1-5.

"WareSeeker.com Script FAQ Search Ranking & Summary", retrieved on Dec. 5, 2008 at <<http://script.wareseeker.com/CGI-Perl/faq-search.zip/5676>>, pp. 1-3.

"Wikipedia: About", retrieved on Dec. 5, 2008 at <<http://en.wikipedia.org/wiki/Wikipedia:About>>, Wikipedia, Dec. 4, 2008, pp. 1-12.

Yang, "Developing an Ontological FAQ System with FAQ Processing and Ranking Techniques for Ubiquitous Services", retrieved on Dec. 5, 2008 at <<http://mail.sju.edu.tw/ysy/pubs/2008-umedia-541.pdf>>, IEEE, 2008, pp. 541-546.

* cited by examiner

ENTERPRISE SEARCH METHOD AND SYSTEM

BACKGROUND

The discussion below is merely provided for general background information and is not intended to be used as an aid in determining the scope of the claimed subject matter.

A large amount of electronic documents are prevalent today throughout organizations and on the Internet. These documents contain useful informational elements for a number of different purposes. In addition to explicit text within the documents, the documents include metadata that is indicative of a particular information retrieval element in a document. There are many different types of metadata for a document including title, author, date of creation, etc. Metadata in documents is useful for many kinds of document processing applications including search, browsing and filtering. Metadata can be defined by an author of the document to be used in these processing applications. However, authors seldom define document metadata appropriately. A search using only metadata, therefore provides limited results.

Other types of documents are available in organizations for intranet search to research people in an organization, and to research technical data. Documents, homepages and the like provide resources for search queries. Current methods of searching different types of data do not provide efficient search results appropriate for the type of search performed. In an Enterprise level search access to information for users is exacerbated. For example, most of the current enterprise systems try to solve this problem by using relevance search and display the results as a list of URLs. What is needed is a system and method that accounts for the type of search requested.

SUMMARY

This Summary is not intended to identify key features or essential features of the claimed subject matter, nor is it intended to be used as an aid in determining the scope of the claimed subject matter.

Embodiments herein are directed to methods and systems that relate to extracting data from resources to respond to a query. The extracted data can include frequently asked question (FAQ) data, term data, personal data and metadata. The methods and systems also relate to retrieving a set of information derived from the extracted FAQ data, term data, personal data and metadata responsive to a query, and receiving feedback responsive to the set of information. In an embodiment, the feedback may augment at least one of the one or more predetermined resources.

This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter. The term "tools," for instance, may refer to system(s), method(s), computer-readable instructions, and/or technique(s) as permitted by the context above and throughout the document.

BRIEF DESCRIPTION OF THE CONTENTS

The detailed description is described with reference to accompanying figures. In the figures, the left-most digit(s) of a reference number identifies the figure in which the reference number first appears. The use of the same reference numbers in different figures indicates similar or identical items.

DETAILED DESCRIPTION

The subject matter discussed below relates generally to processing electronic documents. In one aspect, features are identified from a set of training documents to aid in extracting information from documents to be processed. The features relate to formatting information and linguistic information in the document. One or more models are developed to express these features. During information extraction, documents are processed and analyzed based on at least one of the models and information is extracted based on the models.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices. Tasks performed by the programs and modules are described below and with the aid of figures. Those skilled in the art can implement the description and figures as processor executable instructions, which can be written on any form of a computer readable medium.

Figure 1:
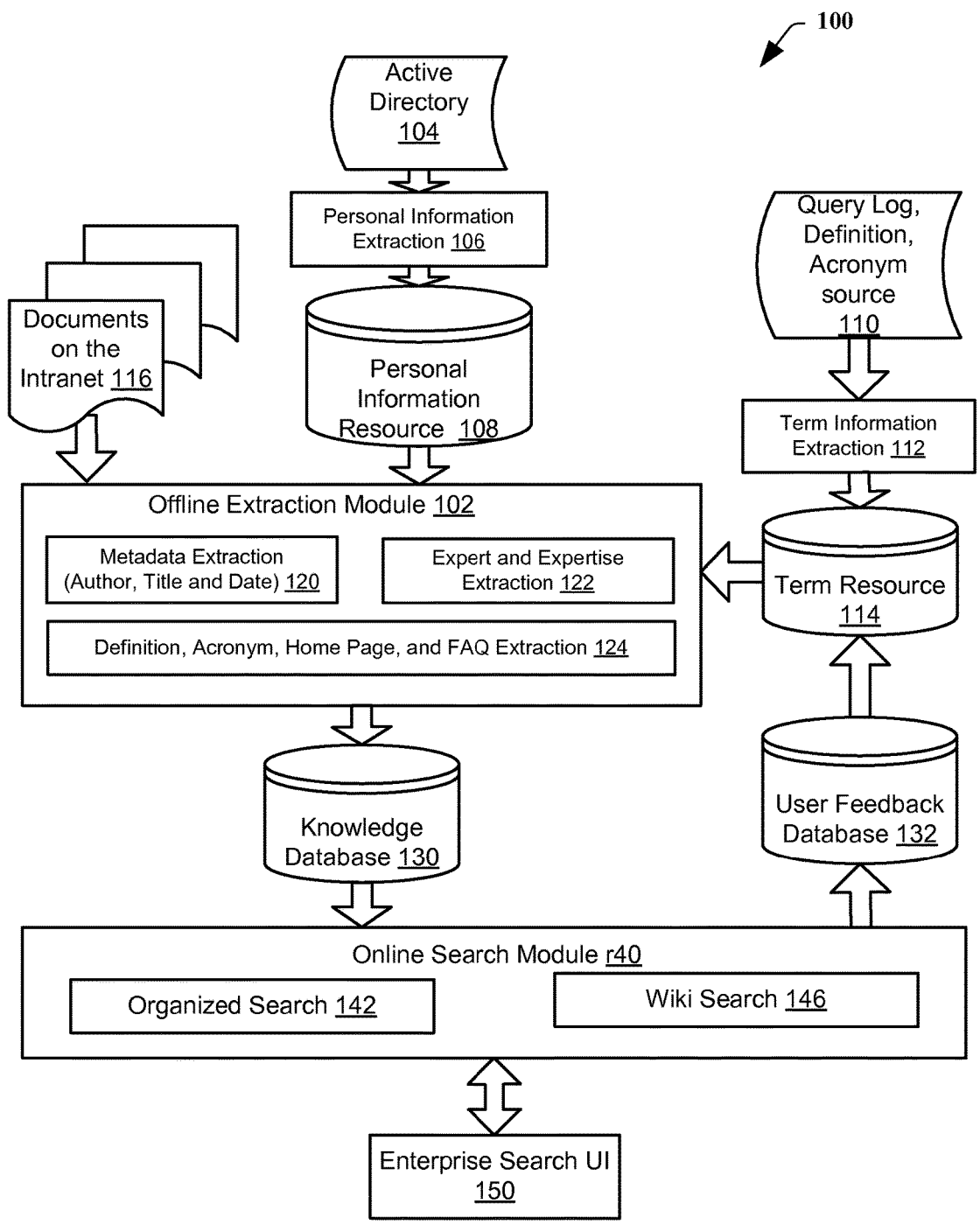
FIG. 1 depicts an illustrative system diagram in accordance with an embodiment of an enterprise search apparatus.

FIG. 1 is an illustrative flow diagram illustrating a system 100 for extracting information from multiple resources. The system includes an offline extraction module 102 that receives data from multiple sources. Active Directory source 104 provides data to the offline extraction module via a personal information extraction module 106 that feeds a personal resource database 108 available to offline extraction module 102. Personal information extraction module 106 extracts the personal information of an employee of an enterprise. The personal information may be extracted from the Active Directory source 104. Personal information can include a display name, title, department, telephone, email, and the like. In one embodiment, information related to an organization's structure can be included in personal information. Another source of data for offline extraction module 102 may include query log, definition, and acronym source 110, that feeds term information extraction module 112.

Term information extraction module 112 may include an extraction of definitions and acronyms from documents. In an embodiment, the definition and acronym extraction may occur in three steps. In the first step, texts are extracted from WORD and HTML documents. Webpage documents can include the extensions: .ascx; .aspx; .asp; .htm; .html. Office documents can include the extensions .doc; .docm; .docx; .dot; .ppt; .pptm; .pptx; .pps and .txt file.

In the second step, definitions and acronyms may be extracted. Terms, including base noun phrases, in definitions are recognized in as long as they include expansions of acronyms. In the third step, all extracted information may be saved into term resource database 114.

Term resource database 114 may include a database tables of definitions with related terms and acronyms with related expansion. In an embodiment, each definition can only have one related term. Likewise, each acronym expansion may only have one acronym.

Term information extraction module 112 may be coupled to term resource database 114, which is available to offline extraction module 102. Another source of data available to offline extraction module 102 includes documents available via an enterprise Intranet 116.

Within offline extraction module 102, operation modules may include metadata extraction module 120, expert and expertise extraction module 122 and definition acronym, home page, and frequently asked questions (FAQ) extraction module 124.

Referring to Table 1, below, a data schema for data extracted is illustrated:

TABLE 1

| Extraction Data Schema | |
| --- | --- |
| Entity/Relation | Data Schema |
| Homepage | Term |
| | Title |
| | Description |
| | URL |
| Person | Display name |
| | Email |
| | Department |

TABLE 1-continued

| Extraction Data Schema | |
| --- | --- |
| Entity/Relation | Data Schema |
| | Title |
| | Telephone |
| | Organization |
| Document | Title |
| | Authors |
| | Date |
| | URL |
| Definition | Term |
| | Definition (context) |
| | URL |
| Acronym | Term |
| | Expansion |
| | Context |
| | URL |
| FAQ | Question |
| | Answer |
| | URL |
| Person and Person Relation | Colleague |
| | Co-author |
| | Co-occurrence |
| Term to Person Relation | Person in author, term in title |
| | Person in author, term in body |
| | Person in body, term in body |
| Person to Term Relation | Term in title, Person in author |
| | Term in body, Person in author |

Offline extraction module 102 is coupled to knowledge database 130 for storing organized extracted data in different formats. One format stored in knowledge database 130 includes user feedback from user feedback database 132 that is shown coupled to term resource database 114, which is coupled to offline extraction module 102.

Knowledge database 130 supplies organized search results to online search module 140, which includes organized search module 142 and wiki search module 146. Organized search module 142 responds to enterprise search user interface 150 by providing organized search results. Wiki search module 146 provides a search option for users who wish to leverage their search with prior user feedback.

Figure 2:
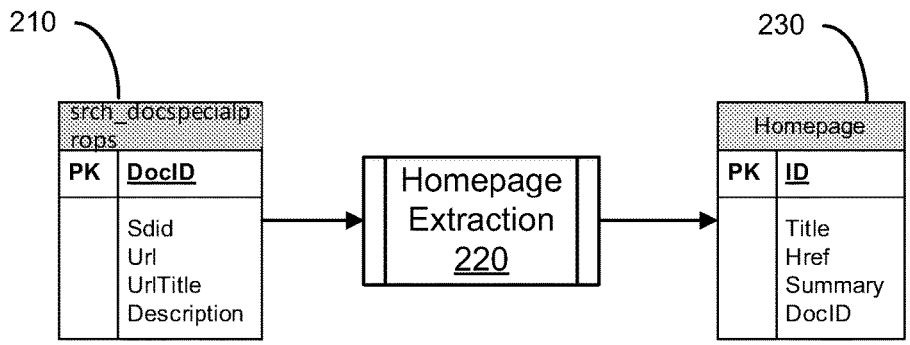
FIG. 2 depicts an illustrative flow diagram that further illustrates a homepage extraction in accordance with an embodiment of the present application.

FIG. 2 illustrates an exemplary method for extracting homepage information within Definition, Acronym, Home Page and FAQ extraction module 124. Block 210 illustrates a search properties data structure used to perform a search, which may include a crawl of html documents, including a source document identifier, a universal resource locator (URL), URL title and description. In an embodiment, a homepage may be a person's homepage or a product/ organization/project's homepage. The search may identify two patterns. One pattern may be the root of a SharePoint site and another pattern may be a domain, which may be a site with one layer URL. Block 210 is coupled to homepage extraction module 220 that performs extractions of homepage data and organizes the data as shown in block 230, as a data structure including title, Href, summary and DocId.

Figure 3:
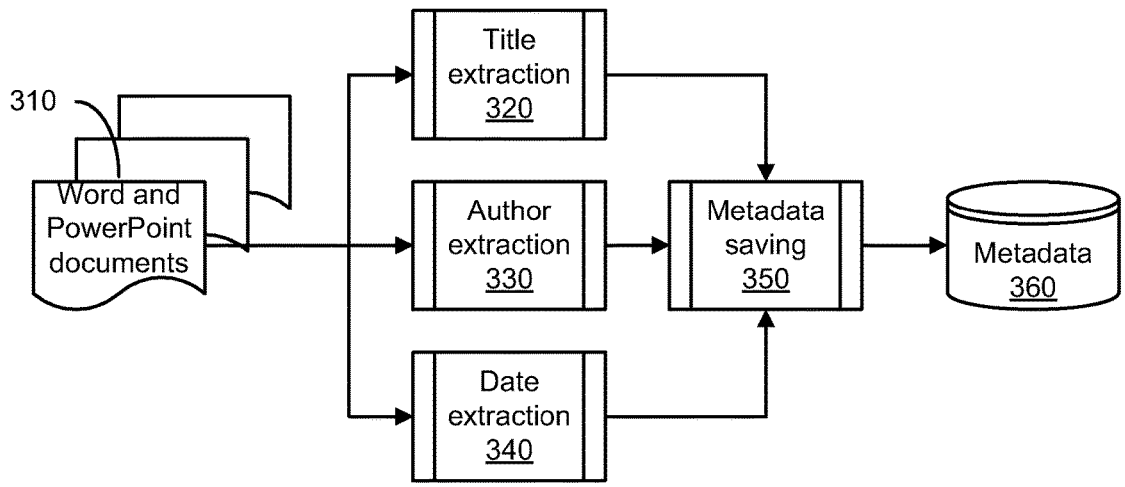
FIG. 3 depicts an illustrative low diagram the further illustrates metadata extraction in accordance with an embodiment of the present application.

FIG. 3 illustrates an exemplary method for extracting metadata within metadata extraction module 120. More specifically, documents, such as Microsoft Office documents such as Word and PowerPoint documents with extensions such as .doc, .docx, .docm, .ppt, .pptx, and .pptm are represented by block documents 310. Block 310 is coupled to three extraction modules, including title extraction 320, author extraction 330 and date extraction 340. Each of title extraction 320, author extraction 330 and date extraction 340 are coupled to metadata saving module 350 to receive the title, author and date data. Metadata saving module provides the combined data to metadata database 360.

Figure 4:
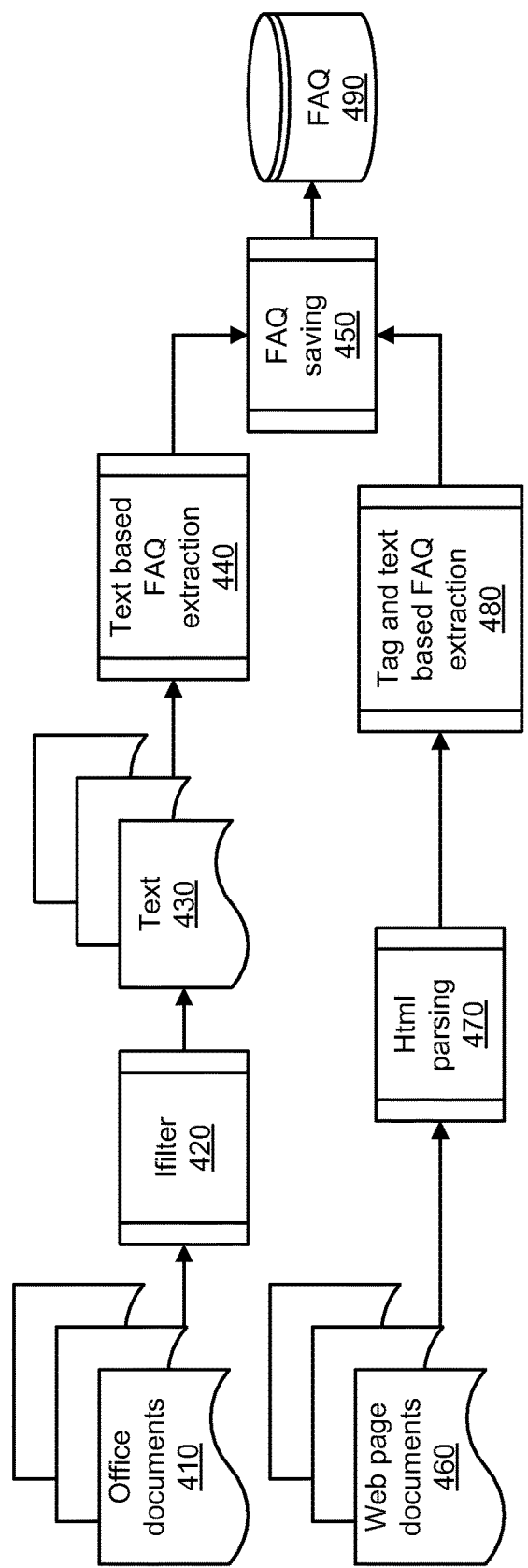
FIG. 4 illustrates a flow diagram for FAQ extraction from documents and webpages in accordance with an embodiment of the present application.

FIG. 4 illustrates an exemplary method for extracting FAQ data, as could be performed in Definition, Acronym, Home Page, and FAQ extraction module 124. As shown, Microsoft Office documents, such as Word documents and PowerPoint documents 410 are filtered by Ifilter module 420 to produce text 430. Next a text based FAQ extraction module 440 operates to produce FAQ data that is saved in FAQ saving 450. Likewise, Webpage documents 460 are passed in HTML parsing module 470 and the results are provided to tag and text-based FAQ extraction module 480.

FAQ extraction module 440, in one embodiment, operates uses a two-stage model to extract question and answer pairs from documents of Word. First, candidate FAQ documents are collected by locating "faq" in a URL, "faq" in a title, "Frequently Asked Questions" in a title, "help" in a URL, and "help" in a title.

If a file, whose name ends with ".doc" or ".docx", meets any of the FAQ requirements, it is a candidate FAQ document. All candidate documents' paths are listed in the file.

Next, question/answer pairs are extracted after text files are created from the documents. In the extracted text file, each doc starts with <message> and ends with </message>. File path of each doc is between <link> and </link>. Content of each doc is between <text> and </text>.

Each text is divided into lines and all operations are conducted on the lines. In the code, function ReadUnits( ) is used to read text line by line. That returns a Boolean value "true" if success, otherwise false.

Four rules are used to count the score of each line: (1) bool Rule1(int LineNumber). If a line starts with a question word (such as how, what etc), this function will return true, otherwise false.

(2) bool Rule2(int LineNumber) If a line ends with question mark, this function will return true, otherwise false.

(3) bool Rule3(int LineNumber) If a line starts with a pattern like "Q" or "Q." or "Q:", function returns true, otherwise false.

(4) bool Rule4(int LineNumber) If a line starts with a number (such as "4.", "11." etc), function returns true, otherwise false.

The score of a line is counted by define an integer s=0; If this line meets Rule 1, s=s+1; If this line meets Rule 2, s=s+2; If this line meets Rule 3, s=s+1; If this line meets Rule 4, s=s+1; If the number of characters in this line is less than 15 or greater than 200, s=0; For each line in the text, we calculate a score for it. If one line gets a score not less than 2 it will be added into question list. At last, if some consecutive lines are questions, they will be removed from question list.

To produce answers, lines between questions are assumed to be answers.

FAQ extraction module 440, in one embodiment, operates uses either a one or a two stage model to extract question and answer pairs from HTML pages. In a two stage model, candidate FAQ HTML pages are collected by locating "faq" in a URL, "faq" in a title, "Frequently Asked Questions" in a title, "help" in a URL, and "help" in a title.

Next, question and answer pairs are extracted by parsing each candidate page to extract the pairs.

In another embodiment, a one-stage mode is used to extract question and answer pairs by skipping the stage of locating candidate HTML pages because only a very small portion of FAQ pages can be selected through the first step. Many pages don't meet any of those rules but they contain question and answer pairs.

Tag and text based FAQ extraction module 480 outputs two lists, one for questions and the other for corresponding answers. First, module 480 performs preprocessing to remove white space (including '\t', '\r', '\n') not between <pre> and </pre> from original text. Next, the extraction module 480 removes strings between <script> and </script> or <style> and </style> and substitutes any " " with space.

Next, text is split into units by special HTML tags (including <br>, <p>, </p>, <div>, </div>, <h[1-6]>, </h[1-6]>, <td>, <dt>, <dd>, <li>). Next, to save running time, this function records text of each unit after removing tags and calculates in advance which units meet these four rules: (1) bool IsHyperlink(string str) If str is a hyperlink, this function will return true, otherwise false. (2) bool Rule1(int line) If the unit's text begins with "Q" and ends with question mark, this function will return true, otherwise false. (3) bool Rule2(int line) If the unit have both pre-tag (<strong><b><u><em><td>) and corresponding post-tag (</strong></b></u></em></td>), and its text ends with question mark, this function will return true. (4) bool Rule3 (int line) If the unit has only pre-tag (<li><dt><p><h[1-6]><td><span><div><font>) and its text ends with question mark, this function will return true, otherwise false.

Next, for each unit, if it meets any of Rule1( ), Rule2( ) or Rule3( ), module 480 assumes the unit is a candidate question. The surrounding tags are extracted as candidate patterns.

Next, the extraction module 480 performs pattern validation. First, the module counts the score of each candidate unit. Next, the module divides all candidate units into groups by their patterns. Units in each group should have the same pattern. Module 480 calculates an average score of each group, and sort groups by average score.

Select candidate patterns from top N groups are determined to be in a final question pattern set. Other patterns are discarded. The number of questions with final question patterns is then set to n1.

The module then searches all units with the pattern in the final question pattern set. If its score is greater than zero, this unit will be added into the question list. Let the number of added questions be n2. If n2 is larger than 2 times of n1, all questions are discarded. In other words, if too many units have the same patterns with the units in top N groups, these patterns are too general, so no FAQs are extracted from the unit.

The score of each unit is counted by defining an integer, s=0. If this unit meets rule1, then s=s+2; If this unit meets rule2, then s=s+1; If this unit meets rule3, then s=s+1; If character amount in this unit is greater than 200, then s=s−1. If sentence number of this unit is between 3 and 6, then s=s−1. If sentence number of this unit is greater than 7, then s=s−2

As described above, any units between two questions is assumed to be an answer. According to an embodiment, all tags are removed from question units and remaining text is provided to a question list. Likewise, all tags are removed from answer units and remaining text is added to an answer list.

FAQ results are provided from text-based FAQ extraction 440 and Tag and text based FAQ extraction 480 to FAQ saving 450 and then to FAQ database 490, which can be incorporated into knowledge database 130 shown in FIG. 1. The FAQ data extracted is in the form of question and answer pairs from the documents in an enterprise, which are then organized in database table of FAQ's 490.

Figure 5:
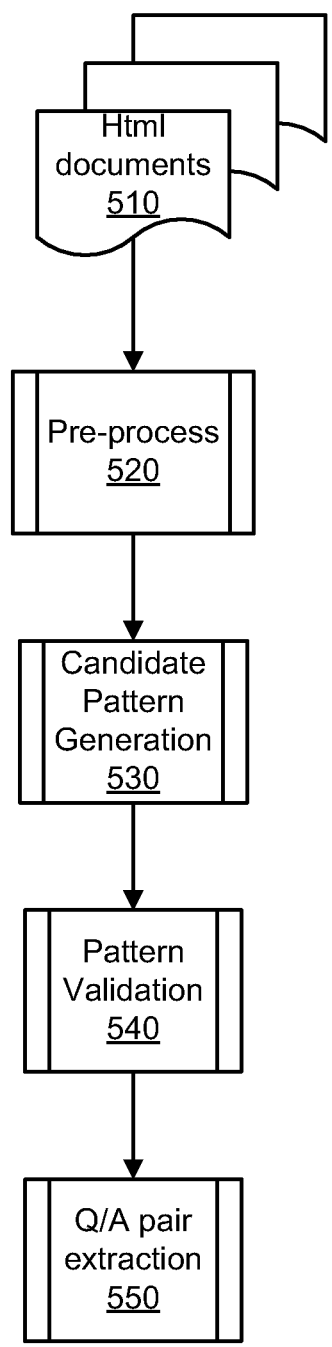
FIG. 5 illustrates a flow diagram for FAQ extraction from HTML documents in accordance with an embodiment of the present application.

Referring to FIG. 5, a flow diagram illustrates a FAQ extraction method for FAQ extraction module 480. Specifically, block 510 represents HTML documents that are preprocessed as discussed above in block 520. Preprocessing readies the data for operations by removing white space and unnecessary tags and the like. Next, block 530 provides for candidate pattern generation appropriate for FAQs. Block 540 provides for validating the patterns found in block 530. Next, block 550 provides for extracting question and answer pairs.

Referring back to FIG. 1, online search module 140 allows a user search FAQ's and let them easily access the FAQ's. FAQ's searched can represent many different types of information, for example, discussion lists and technical notes. Beneficially, a FAQ search as presented herein can result in a set of information that would not be found by a traditional relevance search, since FAQ's are typically within other non-relevant documents.

According to an embodiment, FAQ database 490 hold FAQ formatted data for an enterprise responsive to a FAQ Search by users. The FAQ's extracted by extraction modules 440 and 480 can be from different sources such as discussion lists, technical notes, online forums, and the like.

FAQ extraction by modules 440 and 480 can be conducted by a rule based method. FAQ's can be stored in the database 490 together with other knowledge such as definition, acronym. When the users input a query, the system will return the relevant FAQ's.

FAQs are searched based on a number of factors: the matching degree between the query and the question, length of the question, number of clicks, and the like. A linear combination of the factors can be used.

Figure 6:
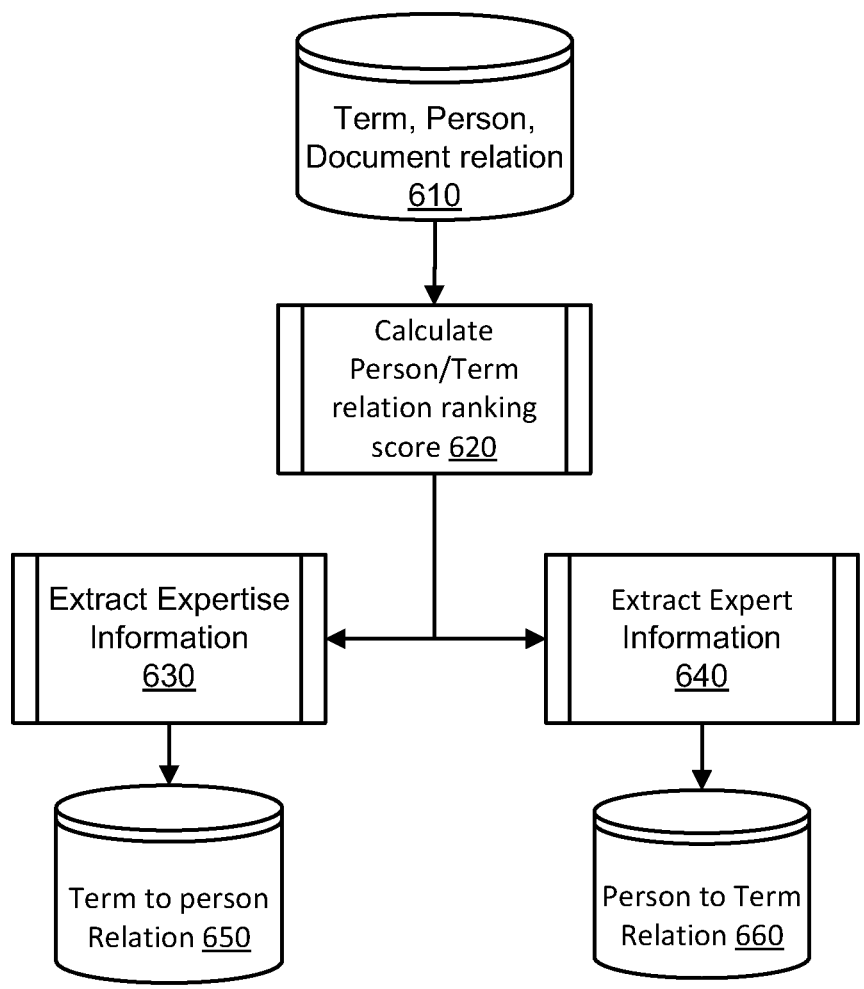
FIG. 6 illustrates a flow diagram for developing term to person relation and person to term relation databases in accordance with an embodiment of the present application.

Referring now to FIG. 6, expert and expertise extraction module 122 is shown in more detail as an illustrative flow diagram. Specifically, block 610 shows a database holding terms person and document relation data. The database 610 is coupled to a module for calculating person/term relation ranking score 620. As shown, the method extracts the relationship between a person and another person and the relationship between a person and a term, and between a term and a person. A "Person and person relation" includes the relationship between people. According to an embodiment, there can be three types of person and person relation. One type includes the "colleague" relation in a company. For example, a colleague can include manager, subordinate, and peer. Another type of relation includes a "co-author" relation. A third type of relation includes a "co-occurrence" which includes a finding of two persons' names in the same document. The scoring of the three types of relationships in an embodiment rates first type of relation as the strongest, the second type of relationship as a weaker score, followed by the third type of relation as the weakest score.

The ranking sore is then provided to both extract expertise information module 630 and to extract expert information module 640. "Term to person relation" is equivalent to an expert search. Module 640 counts the occurrences of "person in author, term in title", "person in author, term in body", and "person in body, term in body". An embodiment is directed to designating a person as an expert for a given search as a function of the number of occurrences.

In another embodiment, module 640 could perform a "Person to term relation" representing the expertise of a person. The person is viewed as one familiar with a term if the term occurs frequently in his documents.

Extracted expertise information is provided to term to person relation database 650 and extracted expert information is provided to person to term relation database 660.

Figure 7:
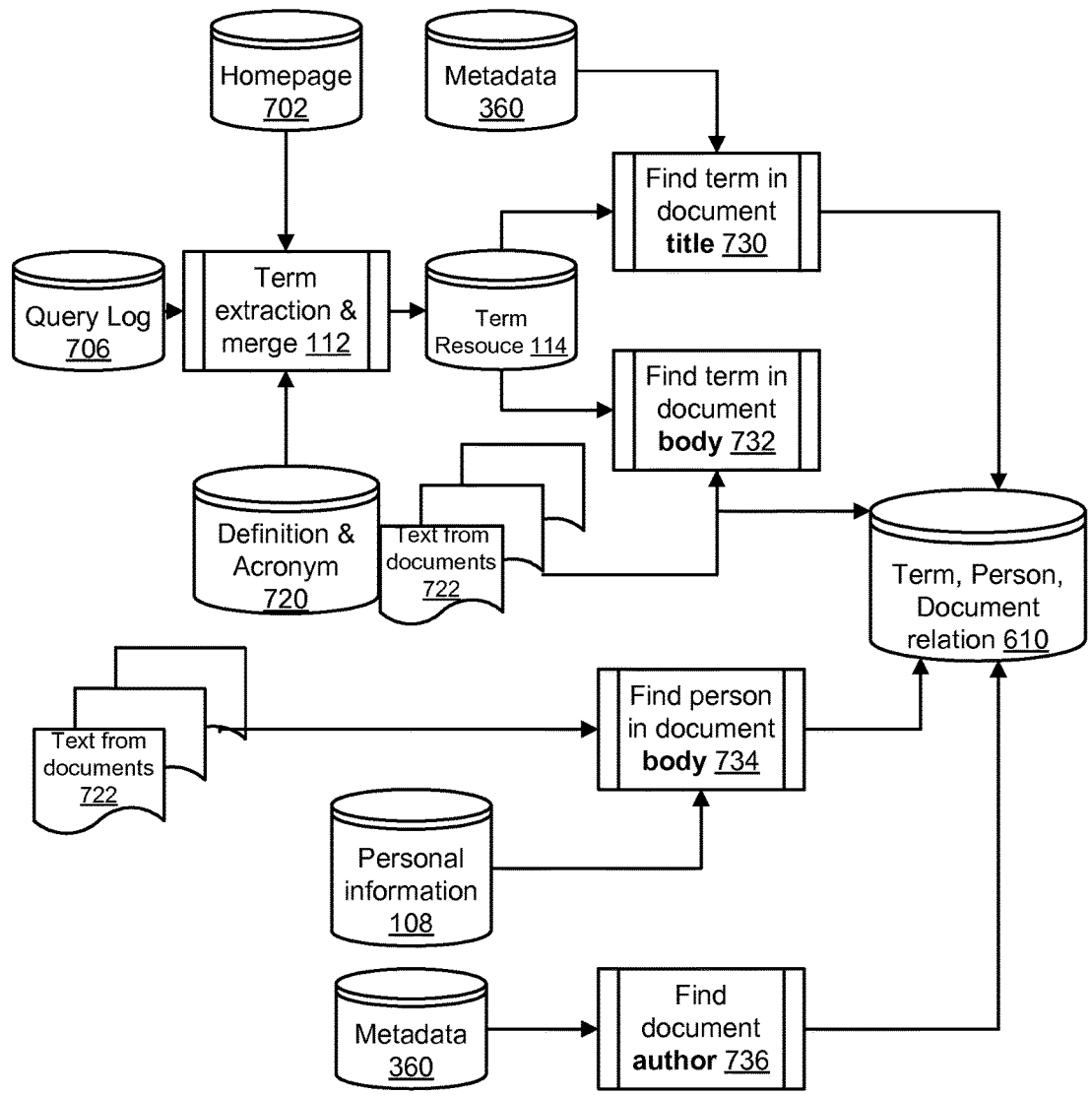
FIG. 7 illustrates a flow diagram for developing a term, person and document relation database in accordance with an embodiment of the present application.

Referring now to FIG. 7, a flow diagram illustrates the method for creating database 610, for storing term, person, and document relationship data.

Specifically, relationship data is determined for database 610 by first collecting data from each of databases metadata 460, homepage 702, query log 706, definition and acronym database 720, personal information resource 108 and term resource 114 in addition to text from documents 722. Homepage 702, query log 706 and definition and acronym 720 each are coupled to term extraction and merge module 112 to create term resource database 114. metadata database 460 and term resource database 114 each provide data to "Find term in document title" database 730. Term resource database 114 and text from documents 722 each provide data to "Find term in document body" module 732. Personal information 108 and text from documents 722 each provide data to "Find person in document body 734"; and metadata 460 provides data to "Find Document Author" module 736. The results from each of modules 730, 732, 734 and 736 provide the data for term, person, document relation 610.

Referring back to FIG. 1, an embodiment is directed to wiki search 146 and corresponding user interface 150. More specifically, wiki search 146 allows users provide feedback for results and enable correction of incorrect results. When the user finds the results is not satisfactory, an embodiment allows the user to modify the result, to vote the results, add new results and assign tags to documents.

In the retrieved results, users can add tags to homepages and documents. The user can also modify or delete the tags provided by him/her. Tags are used for searches of tagged documents including tagged homepages.

In one embodiment, users can add additional information to the search result, for example, document, definition, and homepage. The format of input depends on the type of search result, i.e., the type of resource related to the search result. The user can also modify his/her input data. Inputs from different users can be saved and shown separately. In the retrieved results, user can add tags to homepages and documents. Tags can be used for searches of tagged documents including tagged homepages.

In one embodiment, users can vote on their search result. For example, an add thumb up or thumb down can be included with user interface 150. This information can be aggregated and used in ranking of search results for later searches. In one embodiment, the voting can be conducted on a query and search result pair to provide a relevance of the query and search result and not the quality of the search result. Voting from a user can be modified by the same user. The voting information can be saved into a database. In an embodiment, a user can only vote on a query search result pair. The voting results from the same user are only counted once.

User feedbacks can be displayed in the user search result page of user interface 150. In one embodiment, feedback is also saved to improve the offline extraction module 102 accuracy.

In an embodiment, a user can add additional information to the search result, for example, document, definition, and homepage. The format of input depends on the type of search result, i.e., section of search result. The user can also modify his/her input data. The inputs from users can be validated at the input time. For example, on the length of homepage title.

Inputs for the same query from different users can be allowed in the system, even though there are contradictions (an embodiment assumes that the motivations of users' inputs are to improve the system). For example, a user may add "http://msw" as the home page of the query "msw", but user B may add "http://msw" as the home page of "Microsoft". All user inputs are saved into database online.

Inputs from different users are saved and shown separately. An input from the same user can be modified by the user. User input is not a wiki, i.e., a result is not from multiple users, but a single user. The user input data types are illustrated below in Table 2. An exemplary user feedback data schema is shown in Table 3.

TABLE 2

User input data type

| Entity/Relation | Data Schema | Required |
|---|---|---|
| Homepage | Term | (From user query) |
| | Title | √ default input = query term |
| | Description | ? |
| | URL | √ |
| Person | Display name | X |
| | Email | |
| | Department | |
| | Title | |
| | Telephone | |
| | Organization | |
| Authored Document | Title | √ |
| | Authors | √ (From user query) |
| | Date | ? |
| | URL | √ |
| Definition | Term | √ (From user query) |
| | Definition (context) | √ |
| | URL | X |
| Acronym | Term | √ (From user query) |
| | Expansion | √ |
| | Context | X |
| | URL | X |
| FAQ | Question | √ (From user query) |
| | Answer | √ |
| | URL | X |
| Person and Person Relation | Type | √ colleague/co-author/co-occurrence |
| | Person(From) | From user query |
| | Person(To) | √ |
| Term to Person Relation | Term | √ (From user query) |
| | Person | √ |
| Person to Term Relation | Person | √ (From user query) |
| | Term | √ |

TABLE 3

User Feedback Data Schema

| Entity/Relation | Tag | User input | Vote |
|---|---|---|---|
| Homepage | Y | Y | Y |
| Person | N | N | N |
| Document | Y | Y | Y |
| Definition | N | Y | Y |
| Acronym | N | Y | Y |
| FAQ | N | Y | Y |
| Person and Person Relation | N | Y | Y |
| Person to Term Relation | N | Y | Y |
| Term to Person Relation | N | Y | Y |

Figure 8:
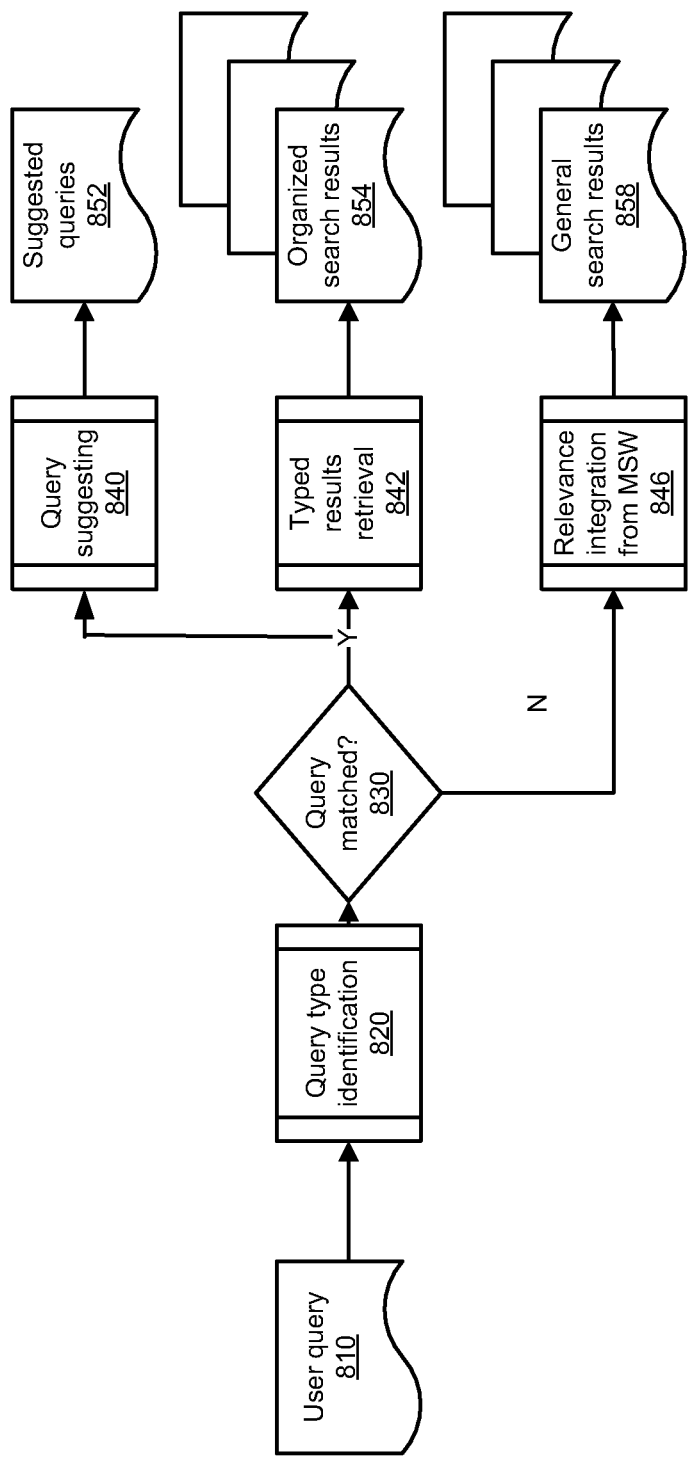
FIG. 8 illustrates a flow diagram for separating a user query in accordance with type of query in accordance with an embodiment of the present application.

Referring back to FIG. 1 in combination with FIG. 8, online search module 140 may include a result retrieval method related to a user query 810. FIG. 8 illustrates a method for retrieving the results. As shown, a user query 810 is provided to a query type identification module 820. Query type identification module, according to one embodiment, builds an index for both term and people names. According to one embodiment, four types of queries, "Person", "Term", "Tag", and "Question" may be indexed separately to provide efficient results. builds different indices for different query types. In an embodiment, data extracted from documents and data collected from user feedback are both indexed. Table 4 illustrates a data schema for the four types of queries.

TABLE 4

Query Type and Related Result Types

| Query Type (Index Type) | Result Types |
|---|---|
| Person | Homepage |
| | Authored document |
| | Related people |
| | Related terms (needs refinement) |
| Term (In Homepage, Definition, Acronym) | Homepage |
| | Definition and acronym |
| | Related people |
| Tag | Tagged homepage |
| | Tagged document |
| Question | FAQ |

Index should be updated when the data is changed. There are two possible strategies for index update: batch mode and online mode. Decision "query matched"? 830 separates the query so that the query is parsed; related result is retrieved; and the related queries are also suggested. If the query matches, query suggesting module 840 provides suggested queries 852. Also, if the query matches, types results retrieval module 842 provides an organized search results 854. If there is no match at block 830, relevance integration module 846 provides general search results 858.

After results are found, online search module 140 ranks retrieved results by qualities, such as a number of documents for homepages. Additionally, user voting results may also be included as a quality metric. According to an embodiment, exact matched results are ranked highly. The exact matched results, in one embodiment, may be leveraged by a full text search feature at SQL Server. Extracted results and user feedback results are aggregated and shown to users at enterprise search user interface 150.

According to an embodiment, tagged documents are included with a relevance search. An embodiment is directed to rules for ranking result including, ranking user input results are always ranked before the automatically extracted results. Results with more votes are ranked before those with fewer votes. The ranking may apply within user input results or automatically via extracted results respectively. If the results have the same votes, an embodiment is directed to ranking by a default ranking function. The default ranking function depends on each resource.

Default ranking functions for a homepage resource include prioritizing by determining whether the homepage is automatically extracted or by user input.(user input takes the higher priority). Second, user rank (voting) is determined. Third, the ranking takes into account the creation time (from new to old). Last, the ranking takes into account the length of Homepage's title. (Ascending order).

Default ranking for definition resources first determines whether the Definition is system extracted or by user input.

(user input takes the higher priority). Second, the ranking takes into account a user rank (voting). Third, the creation time is determined. Last an auto rank by system extraction score is taken into account.

Default ranking for acronym resources first determines whether the acronym is system extracted or by user input (user input takes the higher priority). Second, the ranking takes into account a user rank (voting). Third, the creation time is determined. Last an auto rank by system extraction score is taken into account.

Default ranking for Expertise resources first determines whether the expertise data is system extracted or by user input (user input takes the higher priority). Second, the ranking takes into account a user rank (voting). Third, the evidence count, such as a document count of a term-people relation is determined. Last a creation time is taken into account.

Default ranking for FAQ resources first determines whether the FAQ data was system extracted or by user input (user input takes the higher priority). Second, the ranking takes into account a user rank (voting). Third, a creation time is taken into account in ascending order.

Default ranking for Authored Document resources first determines whether the Authored Document data was system extracted or by user input.(user input takes the higher priority). Second, the user ranking of the person-document relation by voting is taken into account. Last, a creation time is taken into account.

Default ranking for a co-author, co-occurrence or colleague resources first determines whether the co-author, co-occurrence or colleague resource data was system extracted or by user input with user input taking the higher priority. Second, the user ranking by voting is taken into account. Third, an evidence count for a co-author or co-occurrence document count is performed for people to people relations. Last, a creation time is taken into account.

Default ranking for expertise resources first determines whether the expertise resource data was system extracted or by user input.(user input takes the higher priority). Second, the user ranking by voting is taken into account. Third, an evidence count/document count is performed for people to term relations. Last, a creation time is taken into account.

For tagged results, a tagged homepage, rank is determined by user rank via voting first. Then, a document count for the particular homepage is determined.

For tagged documents, rank is determined by user rank via voting first. Then, a creation time for the tagged document is taken into account.

Figure 9:
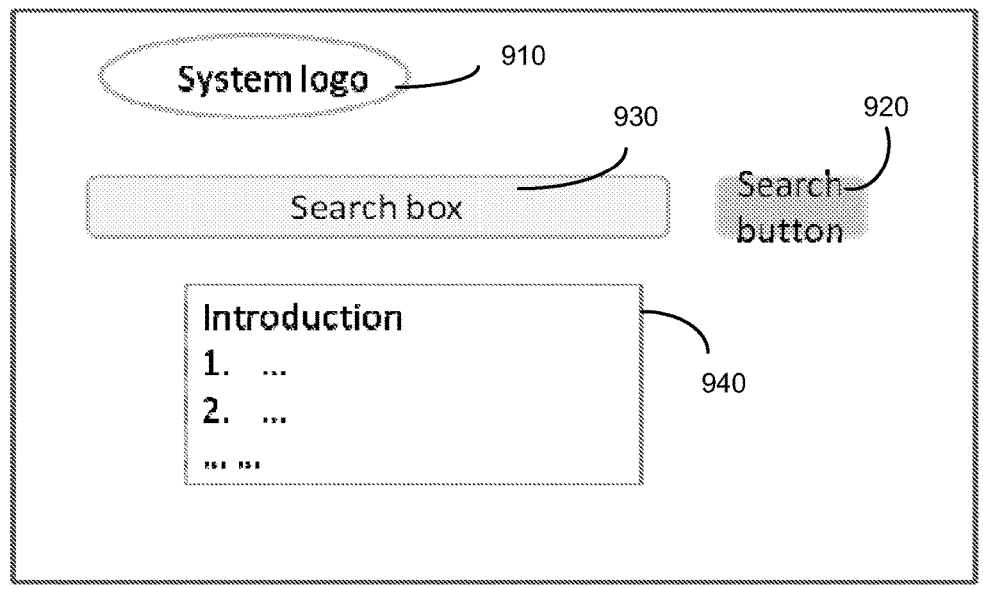
FIG. 9 and FIG. 10 illustrate exemplary user interface pages in accordance with an embodiment of the present application.
Figure 10:
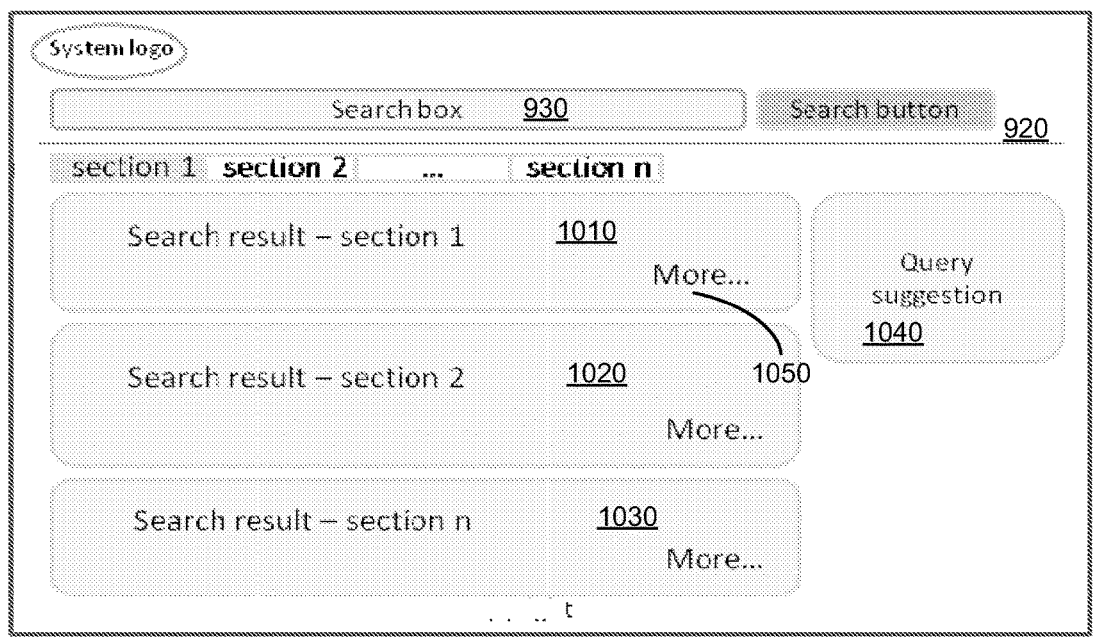

Referring now to FIGS. 9 and 10, screen shots of an exemplary enterprise search user interface 150 are illustrated. In one embodiment, user interface 150 includes at least a query input interface, a result page interface, a user feedback interface and an error type interface.

As shown in FIG. 9, a system logo 910, and search button 920, a search box 930 and an introduction box 940 may be displayed.

As shown in FIG. 10, a results user interface is displayed including a search box 930, search button 920 and results organized into section 1010, 1020 and 1030. In an embodiment, each section includes extracted data and data from user feedback. The opportunity for a user to provide a query suggestion 1040 is also displayed. In one embodiment, the query suggestion 1040 enables a collaborative interface for feedback, the collaborative interface enabling one or more users to edit, delete, modify and/or replace results organized as a set of information.

Further detailed information is available by using one of the tabs identified as "more . . . " 1050.

Figure 11:
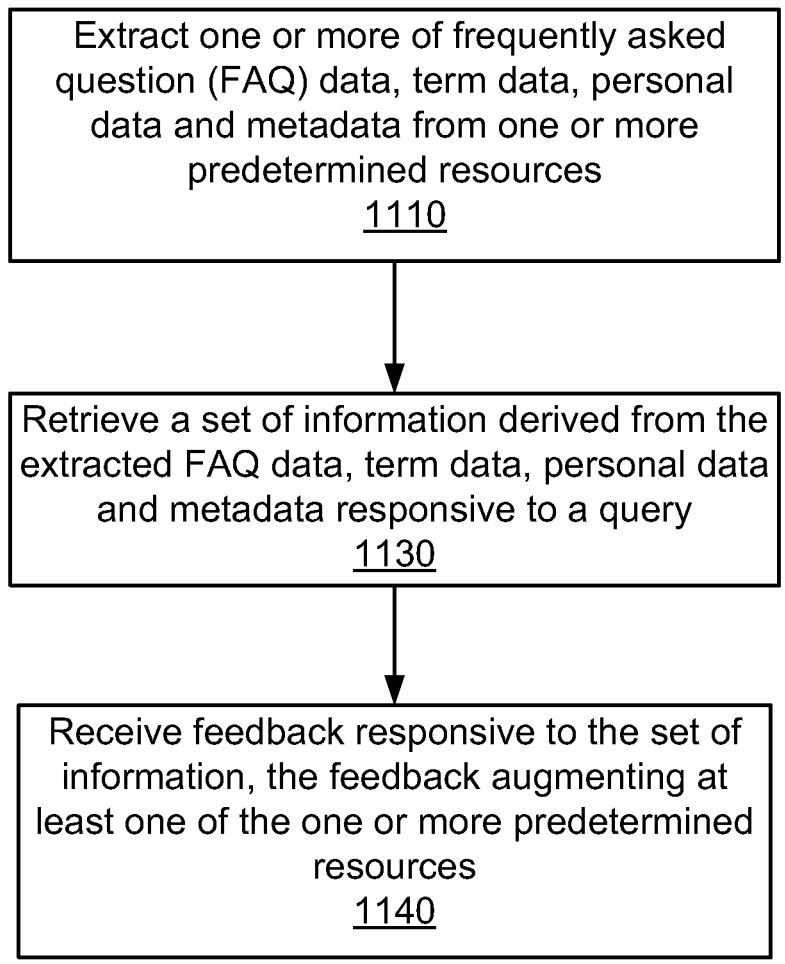
FIG. 11 illustrates a flow diagram for a method in accordance with an embodiment of the present application.

Referring now to FIG. 11, a flow diagram illustrates a method in accordance with an embodiment. As shown, block 1110 provides for extracting one or more of frequently asked question (FAQ) data, term data, personal data and metadata from one or more predetermined resources. For example, referring to FIG. 1, offline extraction module 102 receives data from predetermined resources such as Active Directory 104, documents on an enterprise Intranet 116, a query log, a definition source and an acronym source 110, a term resource 114 and from a user feedback database 132.

Block 1130 provides for retrieving a set of information derived from the FAQ data, term data, personal data and metadata responsive to a query. For example, online search module 140 provides for retrieving a set of information, which may be in sections appropriate to the predetermined source that are responsive to a query receive via enterprise search user interface. The set of information may include FAQs, relevance document results, organized search results and the like.

In one embodiment, the retrieving includes extracting one or more question and answer pairs from the one or more predetermined resources and organizing the one or more answer pairs in a database table of FAQ data.

In one embodiment, the retrieving includes organizing the FAQ data, the term data, personal data and the metadata using machine learning and/or data mining.

Block 1140 provides for receiving feedback responsive to the set of information, the feedback augmenting at least one of the one or more predetermined resources. For example enterprise search user interface 150 may receive feedback that is provided to online search module 140 and to user feedback database 132. From user feedback database 132, term resource database 114 may provide the feedback to offline extraction module 102 to augment knowledge database 130.

Figure 12:
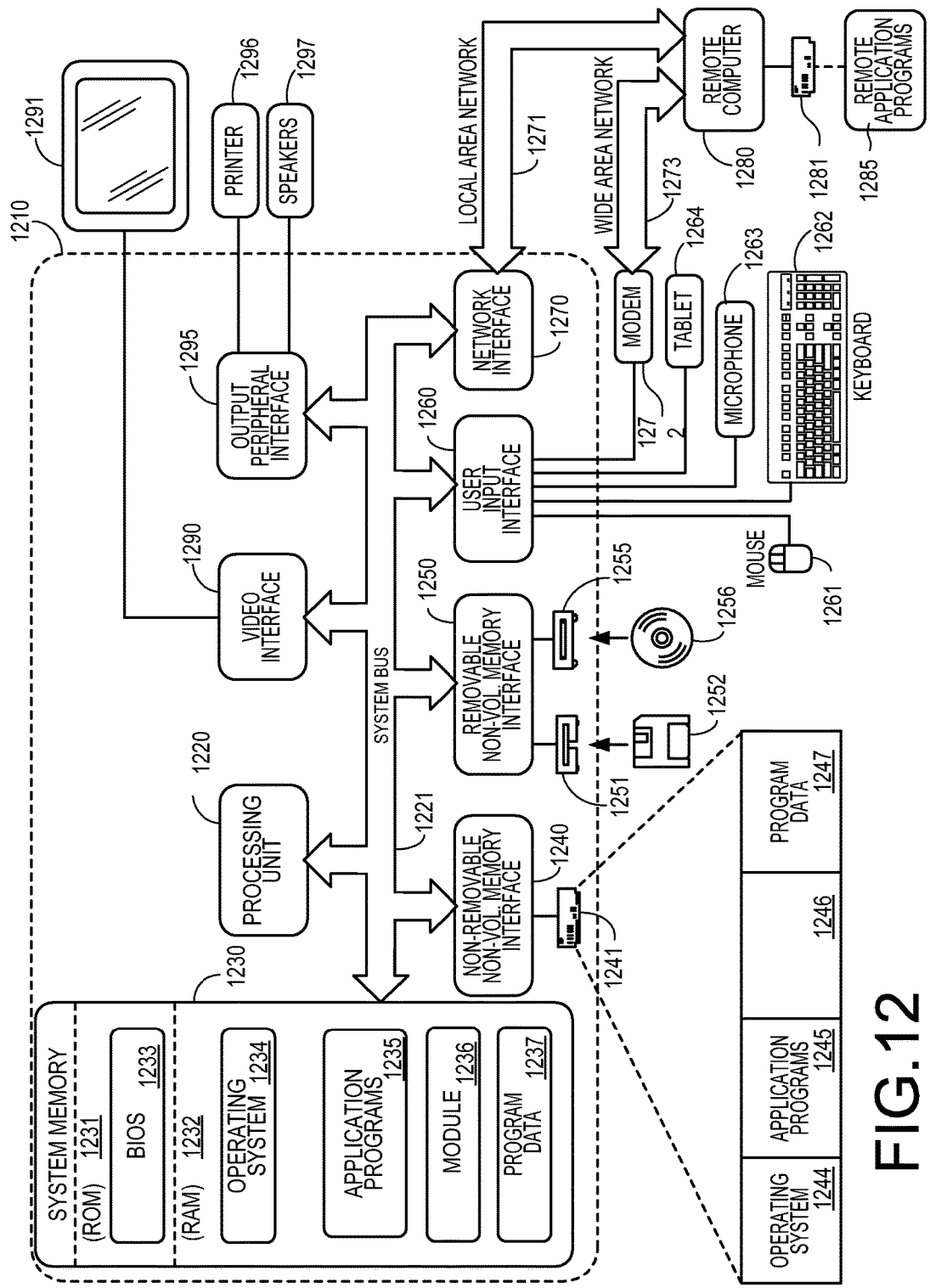
FIG. 12 depicts an illustrative computer environment for practicing one or more embodiments of the present application.

FIG. 12 illustrates an example of a suitable computing system environment 1200 on which the embodiments described above may be implemented. The computing system environment 1200 is only one example of a suitable computing environment and is not intended to suggest any limitation as to the scope of use or functionality of the invention. Neither should the computing environment 1200 be interpreted as having any dependency or requirement relating to any one or combination of components illustrated in the exemplary operating environment 1200.

With reference to FIG. 12, an exemplary system for implementing the invention includes a general purpose computing device in the form of a computer 1210. Components of computer 1210 may include, but are not limited to, a processing unit 1220, a system memory 1230, and a system bus 1221 that couples various system components including the system memory 1230 to the processing unit 1220. The system bus 1221 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 1210 typically includes a variety of computer readable media. Computer readable media may be any available media that may be accessed by computer 1210 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital video disks (DVD) or other optical disk storage, magnetic cassettes, magnetic tape, magnetic disk storage or other magnetic storage devices, or any other medium which may be used to store the desired information and which may be accessed by computer 1210. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 1230 includes computer storage media in the form of volatile and/or nonvolatile memory such as read only memory (ROM) 1231 and random access memory (RAM) 1232. A basic input/output system 1233 (BIOS), containing the basic routines that help to transfer information between elements within computer 1210, such as during start-up, is typically stored in ROM 1231. RAM 1232 typically contains data and/or program modules that are immediately accessible to and/or presently being operated on by processing unit 1220. By way of example, and not limitation, FIG. 12 illustrates operating system 1234, application programs 1235, other program modules 1236, and program data 1237.

The computer 1210 may also include other removable/non-removable volatile/nonvolatile computer storage media. By way of example only, FIG. 12 illustrates a hard disk drive 1241 that reads from or writes to non-removable, nonvolatile magnetic media, a magnetic disk drive 1251 that reads from or writes to a removable, nonvolatile magnetic disk 1252, and an optical disk drive 1255 that reads from or writes to a removable, nonvolatile optical disk 1256 such as a CD ROM or other optical media. Other removable/non-removable, volatile/nonvolatile computer storage media that may be used in the exemplary operating environment include, but are not limited to, magnetic tape cassettes, flash memory cards, digital versatile disks, digital video tape, solid state RAM, solid state ROM, and the like. The hard disk drive 1241 is typically connected to the system bus 1221 through a non-removable memory interface such as interface 1240, and magnetic disk drive 1251 and optical disk drive 1255 are typically connected to the system bus 1221 by a removable memory interface, such as interface 1250.

The drives and their associated computer storage media discussed above and illustrated in FIG. 12, provide storage of computer readable instructions, data structures, program modules and other data for the computer 1210. In FIG. 12, for example, hard disk drive 1241 is illustrated as storing operating system 1244, application programs 1245, other program modules 1246, and program data 1247. Note that these components may either be the same as or different from operating system 1234, application programs 1235, other program modules 1236, and program data 1237. Operating system 1244, application programs 1245, other program modules 1246, and program data 1247 are given different numbers here to illustrate that, at a minimum, they are different copies.

A user may enter commands and information into the computer 1210 through input devices such as a keyboard 1262, a microphone 1263, and a pointing device 1261, such as a mouse, trackball or touch pad. Other input devices (not shown) may include a joystick, game pad, satellite dish, scanner, or the like. These and other input devices are often connected to the processing unit 1220 through a user input interface 1260 that is coupled to the system bus, but may be connected by other interface and bus structures, such as a parallel port, game port or a universal serial bus (USB). A monitor 1291 or other type of display device is also connected to the system bus 1221 via an interface, such as a video interface 1290. In addition to the monitor, computers may also include other peripheral output devices such as speakers 1297 and printer 1296, which may be connected through an output peripheral interface 1295.

The computer 1210 may operate in a networked environment using logical connections to one or more remote computers, such as a remote computer 1280. The remote computer 1280 may be a personal computer, a hand-held device, a server, a router, a network PC, a peer device or other common network node, and typically includes many or all of the elements described above relative to the computer 1210. The logical connections depicted in FIG. 12 include a local area network (LAN) 1271 and a wide area network (WAN) 1273, but may also include other networks. Such networking environments are commonplace in offices, enterprise-wide computer networks, intranets and the Internet.

When used in a LAN networking environment, the computer 1210 is connected to the LAN 1271 through a network interface or adapter 1270. When used in a WAN networking environment, the computer 1210 typically includes a modem 1272 or other means for establishing communications over the WAN 1273, such as the Internet. The modem 1272, which may be internal or external, may be connected to the system bus 1221 via the user-input interface 1260, or other appropriate mechanism. In a networked environment, program modules depicted relative to the computer 1210, or portions thereof, may be stored in the remote memory storage device. By way of example, and not limitation, FIG. 12 illustrates remote application programs 1285 as residing on remote computer 1280. It will be appreciated that the network connections shown are exemplary and other means of establishing a communications link between the computers may be used.

CONCLUSION

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:
1. A system comprising:
one or more processors;
memory coupled to the one or more processors; and a FAQ extraction module stored in the memory and executable by the one or more processors to:
  collect candidate files based at least in part on locating one or more keywords associated with frequently asked questions (FAQs) in the candidate files,
  extract candidate patterns for the FAQs from the candidate files based at least in part on one or more rules associated with the FAQs,
  validate the candidate patterns for the FAQs, validating the candidate patterns comprising:
    obtaining a plurality of candidate units based at least in part on the one or more rules,
    grouping the plurality of candidate units into a plurality of groups based at least in part on the candidate patterns, one or more candidate units in a group of the plurality of groups corresponding to a same candidate pattern,
    selecting first N groups from the plurality of groups, N being an integer greater than zero, and
    validating one or more candidate patterns associated with the first N groups based at least in part on a result of a comparison between a number of candidate units corresponding to the one or more candidate patterns and a predetermined number, and
  extract one or more pairs of questions and answers from the candidate files after the validation of the candidate patterns; and
an online search module stored in the memory and executable by the one or more processors to provide a search result in response to receiving a query, the search result comprising a plurality of sections showing a plurality of result types, with at least one section showing a result type different from one or more result types of other sections, wherein the result type comprises information derived from one or more of FAQ data, term data, personal data or metadata, and the one or more result types comprises information derived from one or more others of the FAQ data, the term data, the personal data or the metadata.

2. The system of claim 1, further comprising an offline extraction module stored in the memory and executable by the one or more processors to extract at least one of the metadata, the term data or the personal data.

3. The system of claim 2, further comprising:
a personal information resource database coupled to the offline extraction module, the personal information resource database including data extracted from an enterprise personal information source;
an intranet source coupled to the offline extraction module, the intranet source for providing documents for data extraction; and
a term resource database coupled to the offline extraction module, the term resource database for receiving user feedback and term information data extracted from one or more sources.

4. The system of claim 2, further comprising a knowledge database coupled to the online search module, the knowledge database to provide a set of information searchable by the online search module, wherein the knowledge database includes a metadata database, the metadata database configured to store metadata derived from documents including one or more of title, author and date extracted by the offline extraction module.

5. The system of claim 2, wherein the offline extraction module includes a homepage extraction module configured to extract homepage data using a uniform resource locator (URL).

6. The system of claim 1, wherein the plurality of result types comprise at least two types associated with: a homepage, an authored document, a person, a definition or a frequently asked question.

7. One or more memory devices storing computer-executable instructions that, when executed by one or more processors, perform acts comprising:
collecting candidate files based at least in part on locating one or more keywords associated with frequently asked questions (FAQs) in the candidate files,
extracting candidate patterns for the FAQs from the candidate files based at least in part on one or more rules associated with the FAQs,
validating the candidate patterns for the FAQs, validating the candidate patterns comprising:
  obtaining a plurality of candidate units based at least in part on the one or more rules,
  grouping the plurality of candidate units into a plurality of groups based at least in part on the candidate patterns, one or more candidate units in a group of the plurality of groups corresponding to a same candidate pattern,
  selecting first N groups from the plurality of groups, N being an integer greater than zero, and
  validating one or more candidate patterns associated with the first N groups based at least in part on a result of a comparison between a number of candidate units corresponding to the one or more candidate patterns and a predetermined number, and
extracting one or more pairs of questions and answers from the candidate files after the validation of the candidate patterns; and
providing a search result in response to receiving a query, the search result comprising a plurality of sections showing a plurality of result types, with at least one section showing a result type different from one or more result types of other sections, wherein the result type comprises information derived from one or more of FAQ data, term data, personal data or metadata, and the one or more result types comprises information derived from one or more others of the FAQ data, the term data, the personal data or the metadata.

8. The one or more memory devices of claim 7, wherein the plurality of result types comprise at least two types associated with: a homepage, an authored document, a person, a definition or a frequently asked question.

9. The one or more memory devices of claim 7, the acts further comprising extracting at least one of the metadata, the term data or the personal data.

10. The one or more memory devices of claim 7, the acts further comprising:
receiving an input of additional information for the search result for augmenting one or more predetermined resources related to the search result; and
augmenting the one or more predetermined resources based at least in part on the input of the additional information.

11. The one or more memory devices of claim 10, wherein the one or more predetermined resources include one or more of a FAQ resource, an active directory resource, an intranet resource or a term resource.

12. The one or more memory devices of claim 10, wherein receiving the input of the additional information comprises receiving feedback as a correction to the search result, a vote associated with the search result, an addition to the search result, and/or an indication of a quality of the search result.

13. The one or more memory devices of claim 7, the acts further comprising causing a display of a collaborative interface for receiving an input of additional information, the collaborative interface enabling one or more users to edit, delete, modify and/or replace the search result.

14. The one or more memory devices of claim 7, the acts further comprising enabling a selection between receiving an organized search result responsive to the query and receiving prior user feedback associated with the query, the prior user feedback being previously provided by one or more users.

15. A method implemented by one or more computing devices, the method comprising:
   collecting candidate files based at least in part on locating one or more keywords associated with frequently asked questions (FAQs) in the candidate files,
   extracting candidate patterns for the FAQs from the candidate files based at least in part on one or more rules associated with the FAQs,
   validating the candidate patterns for the FAQs, validating the candidate patterns comprising:
      obtaining a plurality of candidate units based at least in part on the one or more rules,
      grouping the plurality of candidate units into a plurality of groups based at least in part on the candidate patterns, one or more candidate units in a group of the plurality of groups corresponding to a same candidate pattern,
      selecting first N groups from the plurality of groups, N being an integer greater than zero, and
      validating one or more candidate patterns associated with the first N groups based at least in part on a result of a comparison between a number of candidate units corresponding to the one or more candidate patterns and a predetermined number, and
   extracting one or more pairs of questions and answers from the candidate files after the validation of the candidate patterns; and
   providing a search result in response to receiving a query, the search result comprising a plurality of sections showing a plurality of result types, with at least one section showing a result type different from one or more result types of other sections, wherein the result type comprises information derived from one or more of FAQ data, term data, personal data or metadata, and the one or more result types comprises information derived from one or more others of the FAQ data, the term data, the personal data or the metadata.

16. The method of claim 15, further comprising:
   receiving an input of additional information for the search result for augmenting one or more predetermined resources related to the search result; and
   augmenting the one or more predetermined resources based at least in part on the input of the additional information.

17. The method of claim 16, wherein the one or more predetermined resources include one or more of a FAQ resource, an active directory resource, an intranet resource or a term resource.

18. The method of claim 16, wherein receiving the input of the additional information comprises receiving feedback as a correction to the search result, a vote associated with the search result, an addition to the search result, and/or an indication of a quality of the search result.

19. The method of claim 15, further comprising causing a display of a collaborative interface for receiving an input of additional information, the collaborative interface enabling one or more users to edit, delete, modify and/or replace the search result.

20. The method of claim 15, further comprising enabling a selection between receiving an organized search result responsive to the query and receiving prior user feedback associated with the query, the prior user feedback being previously provided by one or more users.

* * * * *